United States Patent [19]

Ryu

[11] Patent Number: 4,789,993
[45] Date of Patent: Dec. 6, 1988

[54] ONE FREQUENCY REPEATER FOR A DIGITAL RADIO SYSTEM

[75] Inventor: Toshihiko Ryu, Tokyo, Japan

[73] Assignee: NEC Corporation, Tokyo, Japan

[21] Appl. No.: 908,847

[22] Filed: Sep. 18, 1986

[30] Foreign Application Priority Data

Sep. 18, 1985 [JP] Japan .................. 60-207066
Sep. 18, 1985 [JP] Japan .................. 60-207067
Sep. 30, 1985 [JP] Japan .................. 60-218380
Nov. 19, 1985 [JP] Japan .................. 60-259993

[51] Int. Cl.⁴ .............................. H04B 7/15
[52] U.S. Cl. ........................ 375/4; 455/24; 178/70 S
[58] Field of Search ............... 375/3, 4; 370/32, 32.1; 455/20, 21, 22, 24, 78, 81, 311; 379/340, 406, 410, 411; 178/70 R, 70 S

[56] References Cited

U.S. PATENT DOCUMENTS

| | | | |
|---|---|---|---|
| 4,406,016 | 9/1983 | Abrams et al. | 455/24 |
| 4,464,545 | 8/1984 | Werner | 370/32.1 |
| 4,475,243 | 10/1984 | Batlivala et al. | 455/24 |
| 4,520,476 | 5/1985 | Searl | 370/32 |
| 4,701,935 | 10/1987 | Namiki | 375/4 |

Primary Examiner—Robert L. Griffin
Assistant Examiner—Marianne Huseman
Attorney, Agent, or Firm—Sughrue, Mion, Zinn, Macpeak, and Seas

[57] ABSTRACT

A one frequency repeater includes a receiver for receiving a reception signal through a receiving antenna, a variable frequency characteristic filter for generating a signal for cancelling an interference signal caused by leakage of a transmission signal into a receiving antenna, an adder for adding the interference signal and the reception signal, a demodulator for demodulating an output signal from the adder, a data converter for converting an output signal from the modulator, a modulator for modulating a carrier according to an output from the data converter, and a transmitter for transmitting from a transmitting antenna an output signal modulated by the modulator. The variable frequency characteristic filter receives the signal modulated by the modulator, is controlled in response to a control signal including the output from the data converter, and supplies the interference cancellation signal to the adder.

9 Claims, 5 Drawing Sheets

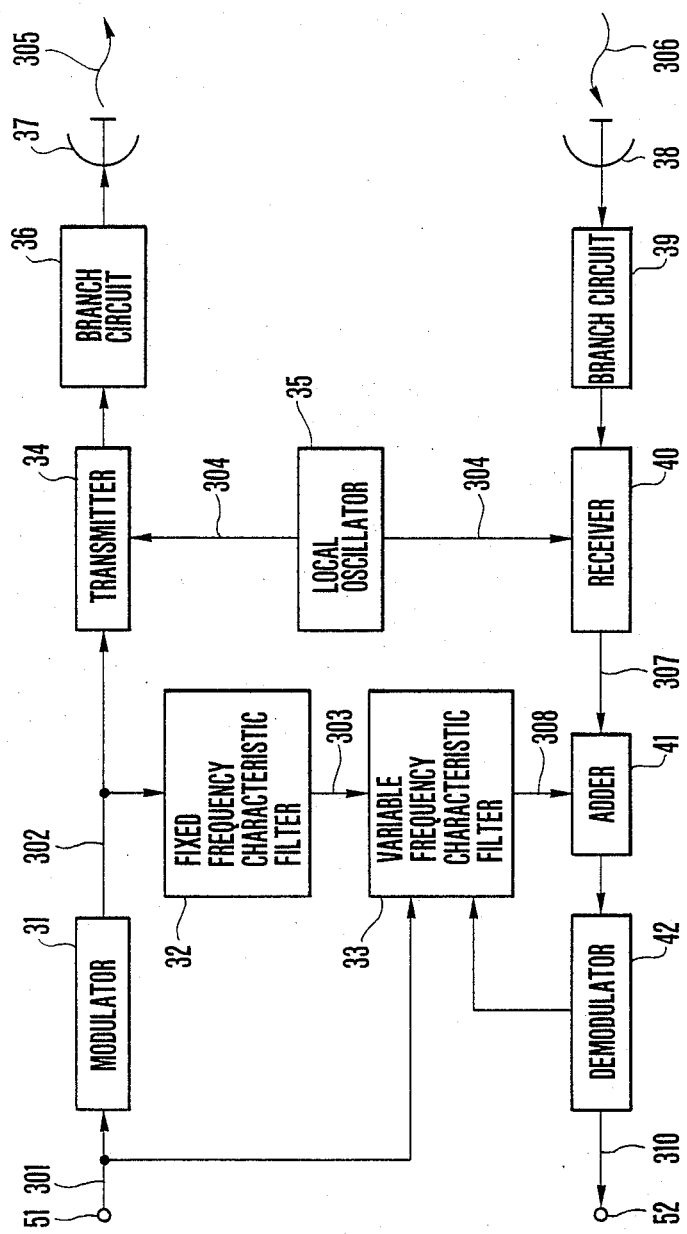

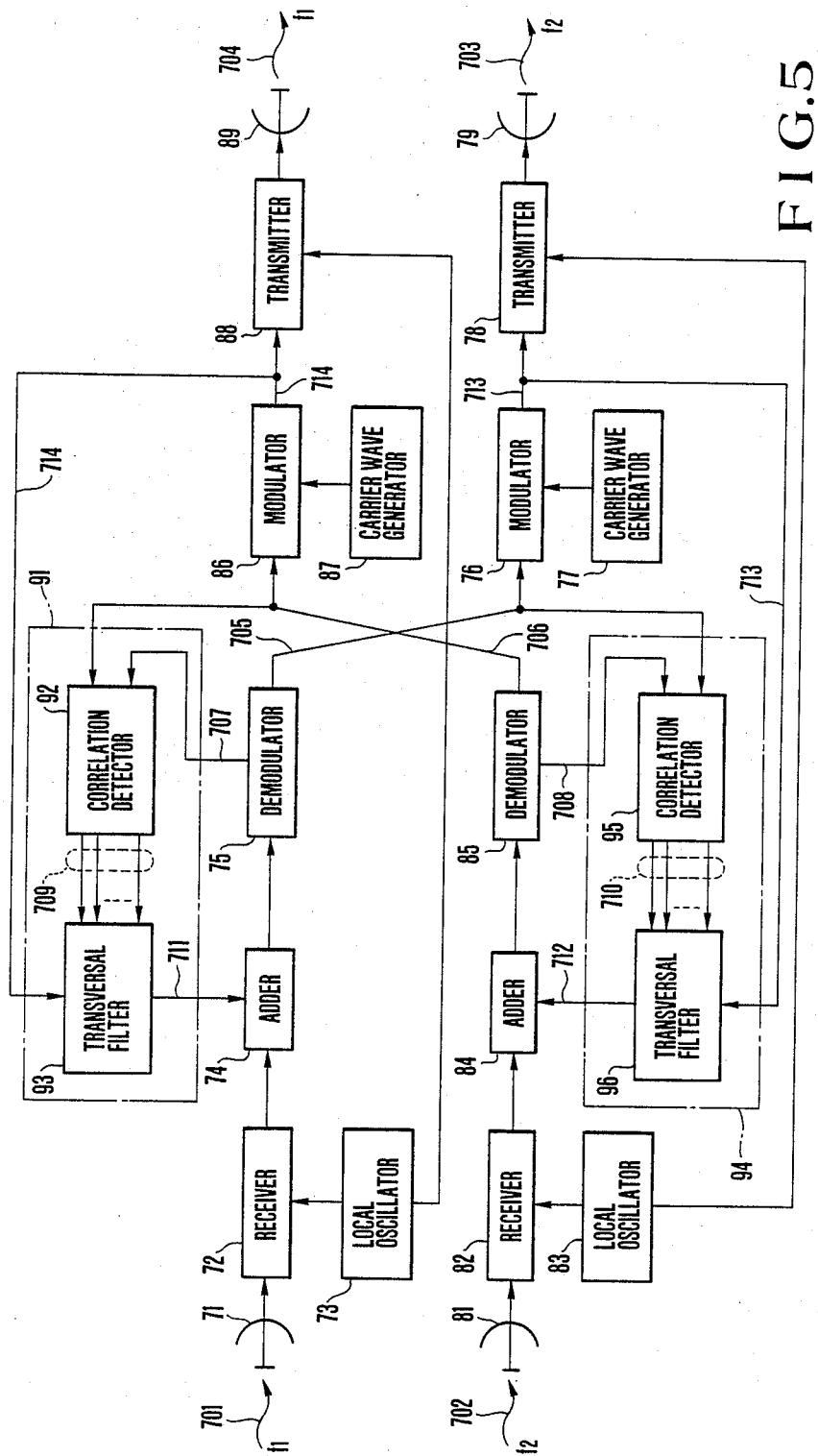

ONE FREQUENCY REPEATER FOR A DIGITAL RADIO SYSTEM

BACKGROUND OF THE INVENTION

The present invention relates to a one frequency repeater for a digital radio wave transmission, and in particular, to the one frequency repeater which has high cancellation capability of a transmitter-to-receiver interference.

In a digital radio wave transmission system, a carrier, usually a microwave modulated by a digital baseband signal to be transmitted is transmitted as a digital microwave radio signal. A repeater used in the digital microwave transmission system has at least one, usually two repeating paths. Each repeating path comprises a pair of receiving and transmitting antennas. The digital microwave is received at the receiving antenna and is demodulated. The demodulated signal is applied to a modulator which modulates a carrier by the recovered digital baseband signal. Then the modulated digital microwave signal is radiated from the transmitting antenna.

The receiving antenna of one repeating path and the transmitting antenna of the other path are mounted side by side on a front face of the repeater, while the transmitting antenna of the one repeating path and the receiving antenna of the other being arranged side by side on the opposite back face of the repeater.

In the repeater, transmitting signals from the two transmitting antennas may interfere the desired signal received at each one receiving antenna, due to the side-to-side and front-to-back antenna couplings.

In order to avoid such a transmitter-to-receiver interference, a conventional repeating system uses a pair of different transmitting and receiving carrier frequencies in all hops over and over again. This system is called a two frequency repeating system.

In the view point of the frequency utilization efficiency, the two frequency repeating system is inferior to a one-frequency repeating system where the same frequency carrier pair is used for both transmitting and receiving carriers in common for all hops. In order to realize the one frequency repeating system, the transmitter-to-receiver interference must be eliminated. In order to eliminate such an interference, various proposals have been made. However, the repeaters in the conventional proposals are unsatisfactory in elimination of the transmitter-to-receiver interference for the following reasons.

(1) In the general arrangement of the conventional repeater, a signal received by a receiving antenna is supplied to a receiver. An output signal of the receiver is added in an adder to an interference cancellation signal output from a variable frequency characteristic filter to eliminate a transmission signal component leaking from the transmitting antenna to the receiving antenna. The signal free from the leakage component of the transmission signal is supplied to a demodulator. An output from the demodulator is supplied to a modulator, and an output from the modulator is supplied to the transmitter and a transversal filter which generates the interference cancellation signal in the variable frequency characteristic filter. The variable frequency characteristic filter comprises a correlation detector for detecting a correlation coefficient representing a correlation between the transmission signal and the reception signal and supplies a weighting control signal determined by the correlation coefficient to the transversal filter, thereby controlling the interference cancellation signal. Since the transmission and reception signals include an identical baseband signal, the correlation between the reception signal and the transmission signal component leaking into the reception signal via the receiving antenna is excessively strong to disable accurate correlation detection. Therefore, the magnitude of the interference cancellation signal to be supplied to the adder, and hence proper interference cancellation cannot be performed in the adder.

(2) The variable frequency characteristic filter is designed to correspond to the interference signal along a variable interference route. However, the leakage of the transmission signal into the reception signal is present from the modulator output point as an interference signal determined by an inherent frequencies of the transmitter and the receiver. The function of the variable frequency characteristic filter must include a correction function for correcting the inherent frequency characteristics in addition to the above-mentioned function for compensating the variable interference route. As a result, the correction function inherent to the variable frequency characteristic filter is impaired.

(3) In conventional one frequency repeater, a means for setting a transmission signal carrier frequency is associated with both a frequency of a carrier signal generated by a carrier generator and a frequency of a local oscillated signal generated by a local oscillator. The carrier frequency of the transmission signal does not strictly coincide with the carrier frequency of the reception signal due to actual deviations or temporal variations in these frequencies. For this reason, the leakage of the transmission signal into the reception singal generates a beat frequency component. This beat frequency component is generated regardless the phase of the carrier signal of the reception signal. Even if the amplitude and phase distortion correction functions by an equalizer in a demodulator are used, the beat frequency component cannot be eliminated. Therefore, high circuit quality of the radio communication system cannot be maintained due to an interference caused by leakage of the transmission signal into the reception signal.

SUMMARY OF THE INVENTION

It is an object of the present invention to eliminate conventional drawbacks described above and to provide a one frequency repeater where any transmitter-to-receiver interference signal can be effectively and reliably eliminated.

It is another object of the present invention to provide a one frequency repeater where an interference cancellation capability is not degraded even if the transmission and reception signals include an identical baseband signal.

It is still another object of the present invention to provide a one frequency repeater capable of effectively eliminating interference components based on variable frequency characteristics of an interference signal and frequency characteristics inherent to a transmitter and a receiver.

It is still another object of the present invention to provide a one frequency repeater capable of eliminating carrier frequency deviations by an interference signal caused by transmission signal leakage.

In order to achieve the above objects of the present invention, there is provided a one frequency repeater comprising means for receiving a reception signal through a receiving antenna, means for generating a signal for cancelling an interference signal caused by leakage of a transmission signal into a receiving antenna, means for adding the interference signal and the reception signal, means for demodulating an output signal from the adding means, means for converting an output signal from the demodulating means, modulating means for modulating a carrier according to an output from the data converting means, and transmitting means for transmitting from a transmitting antenna an output signal modulated by the modulating means, the interference cancellation signal generating means being supplied with the signal modulated by the modulating means, controlled in response to a control signal including the output from the data converting means, and adapted to supply the interference cancellation signal to the adding means.

BRIEF DESCRIPTION OF THE DRAWINGS

FIG. 3 is a block diagram of a one frequency repeater according to another embodiment of the present invention;

FIG. 5 is a block diagram of a one frequency repeater according to still another embodiment of the present invention.

DETAILED DESCRIPTION OF THE PREFERRED EMBODIMENTS

The present invention will be described in detail with reference to preferred embodiments in conjunction with the accompanying drawings.

Figure 1:
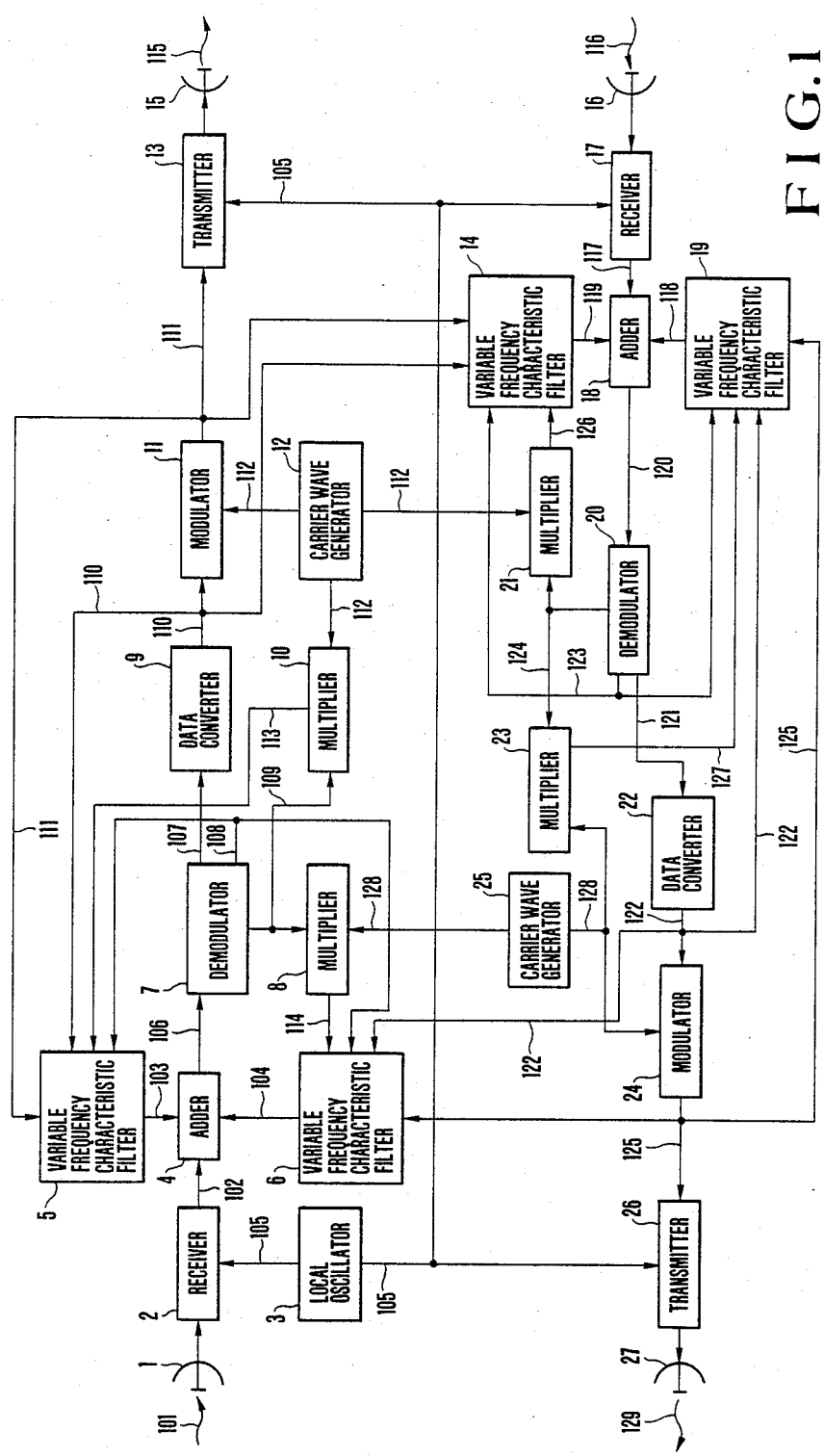
FIG. 1 is a block diagram of a one frequency repeater for repeating data along the upward and downward channels according to an embodiment of the present invention.

FIG. 1 is a block diagram of a one frequency repeater according to an embodiment of the present invention. The upper half block in FIG. 1 is the same as the lower half block therein although the right-hand side of the upper half block corresponds to the left-hand side of the lower half block. The one frequency repeater performs repeating along the upward and downward channels. Along the upward channel, a reception signal 101 whose carrier frequency is f1 (nominal value) is received through a receiving antenna 1 by a receiver 2. In the receiver 2, the carrier frequency f1 (nominal value) of the reception signal is converted into an intermediate frequency in response to a local oscillated signal 105 from a local oscillator 3. The intermediate frequency is amplified so that an IF reception signal 102 is output. The signal 102 includes an interference signal caused by leakage of a transmission signal 115 having an identical frequency f1 (nominal value) and radiated from a transmitting antenna 5. The signal 102 is input to an adder 4 and added thereby to an interference cancellation signal supplied from a variable frequency characteristic filter 5, thereby reducing a level of the interference signal. An output ignal 106 from the adder 4 is supplied to a demodulator 7. The demodulator 7 outputs a demodulated output signal 107. At the same time, the demodulator 7 supplies an error signal 108 to the variable frequency characteristic filter 5 and a recovered carrier wave 109 to a multiplier 10. The demodulated output signal 107 from the demodulator 7 is input to a data converter 9. An output signal 110 from the data converter 9 is supplied to a modulator 11, the variable frequency characteristic filter 5 and a variable frequency characteristic filter 14. A signal 111 modulated by the modulator 11 is supplied to a transmitter 13 and the variable frequency characteristic filter 5.

In the transmitter 13, a frequency of the modulated signal 111 is converted to the predetermined transmission frequency f1 in response to the local oscillated signal 105 from the local oscillator 3. The power of the frequency f1 is amplified, and the amplified signal is radiated as the transmission signal 115 from a transmitting antenna 15.

The arrangement of the downward repeating circuit (the lower half) in FIG. 1 is the same as described above. More specifically, the receiving antenna 1 is replaced with a receiving antenna 16; 2 with 17, 4 with 18, 5 with 19, 7 with 20, 8 with 21, 9 with 22, 10 with 23, 11 with 24, 12 with 25, 13 with 26, and 15 with 27. The local oscillator 3 is commonly used in the upward and downward repeating circuits.

The signal 101 is replaced with a signal 116, 102 with 117, 103 with 118, 104 with 119, 106 with 120, 107 with 121, 108 with 123, 109 with 124, 110 with 122, 111 with 125, 112 with 128, 113 with 127, 114 with 126, and 115 with 129.

Figure 2A:
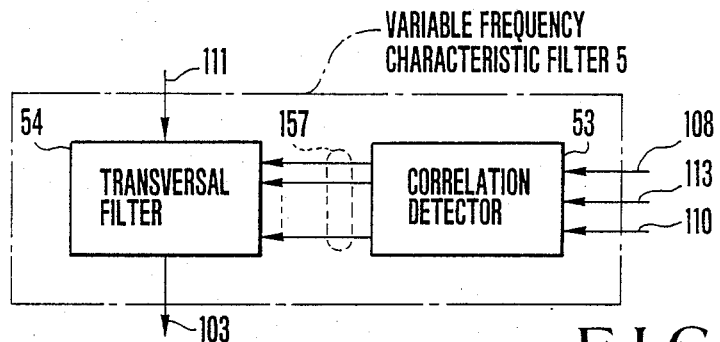
FIGS. 2A to 2D are respectively block diagrams showing internal circuits of variable frequency characteristic filters in FIG. 1.

FIGS. 2A to 2D are circuit diagrams of variable frequency characteristic filters 5, 6, 14, and 19. These filters have an identical arrangement. Referring to FIG. 2A, the variable frequency characteristic filter 5 includes a correlation detector 53 and a transversal filter 54. The correlation detector 53 receives the error signal 108 output from the demodulator 7, the frequency offset signal 113 output from the multiplier 10, and the output signal 110 from the data converter 9. The multiplier 10 receives the recovered carrier wave 109 output from the demodulator 7, and the carrier signal 112 output from the carrier generator 12. The carrier wave 109 and the carrier signal 112 are defined to have an identical frequency. However, in practice, these signals have a frequency offset therebetween. The frequency offset signal 113 output from the multiplier 10 is a beat frequency signal representing a frequency difference between the recovered carrier wave 109 and the carrier signal 112. The correlation detector 53 mainly detects an interference signal corresponding to the transmission signal 115 according to the output signal 110 from the data converter 9, the error signal 108, and the frequency offset signal 113. The correlation detector 53 outputs a plurality of control signals 157 for minimizing the interference signal. The plurality of control signals 157 are input to the corresponding tap weighting circuits in the transversal filter 54. The transversal filter 54 receives the modulated signal 111 from the modulator 11. The interference cancellation signal 103 corresponding to the transmission signal 115 is output according to the control behavior of the tap weighting circuit in response to the plurality of control signals 157. The interference cancellation signal 103 is input to the adder 4.

Figure 2B:
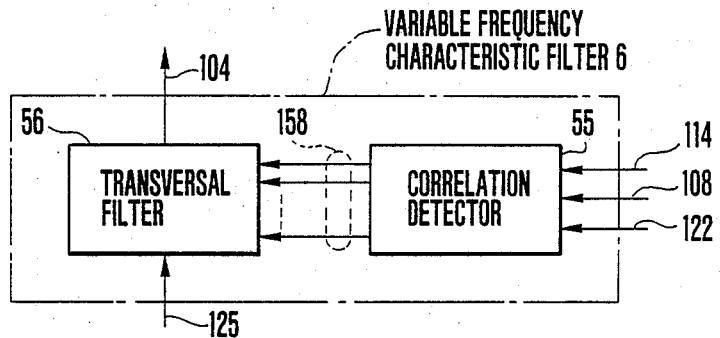
Figure 2C:
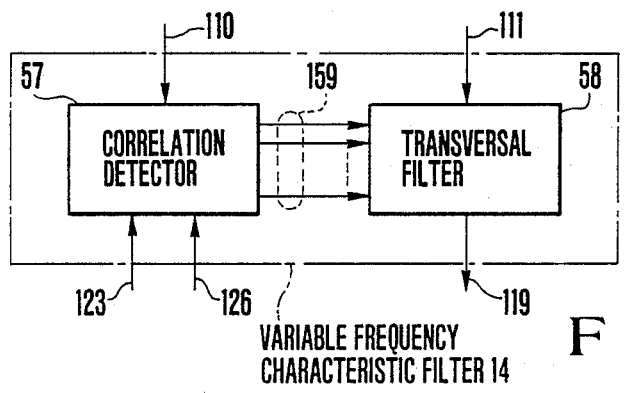
Figure 2D:
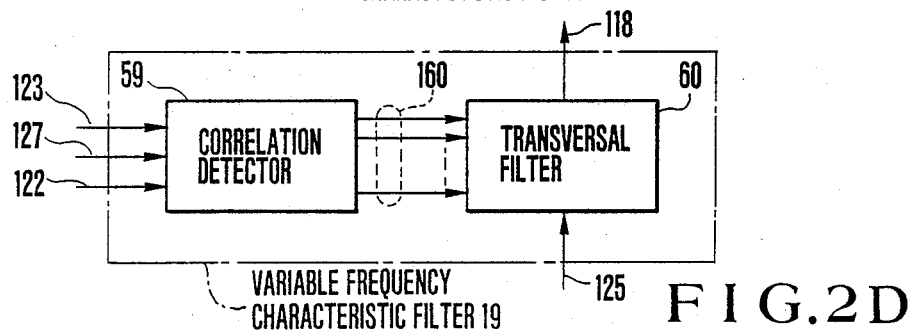

The variable frequency characteristic filters in FIGS. 2B, 2C, and 2D are the same as that of the filter 5.

The feature of this embodiment of the present invention is as follows. Among the three signals supplied to the correlation detector 53 in the variable frequency characteristic filter 5, the error signal 108 from the demodulator 7 and the frequency deviation signal 113 from the multiplier 10 are the same as those in the conventional one frequency repeater. However, the output signal 107 from the demodulator is used as the third input signal to the correlation detector 53 in the conventional one frequency repeater, while the output signal 107 from the demodulator is converted into the signal 110 by the data converter 9, and the signal 110 is supplied to the correlation detector 53 in this embodiment of the present invention.

The interference signal caused by leakage of the transmission signal 115 into the receiving antenna 1 has the same baseband signal as that of the reception signal. Therefore, this baseband signal is present in the output signal 107 from the demodulator 7. Since the three input signals 107, 108, and 113 to the correction detector 53 in the variable frequency characteristic filter 5 include the identical baseband signal according to the conventional repeater arrangement, the correlation detector 53 cannot sufficiently detect the interference signal. Therefore, the control signals 157 input to the transversal filter 54 are inaccurate. As a result, the interference cancellation signal 103 input to the adder 4 cannot sufficiently cancel the interference signal.

However, in the embodiment (FIG. 1) of the present invention, the correlation between the converted signal 110 obtained by data-converting the demodulated output signal by the data converter 9 and other two signals is calculated.

The data converter 9 scrambles the demodulated output signal 107 into the converted signal 110. For this reason, the interference signal caused by leakage of the transmission signal 115 into the receiving antenna has a different form of baseband signal to that of the frequency (f1) signal. Therefore, the interference signal can be detected by the correlation detector 53 in the variable frequency characteristic filter 5 and can be effectively cancelled by the adder 4 according to the interference cancellation signal 103.

The above description has been made for cancellation of the interference signal caused by leakage of the transmission signal 115 into the receiving antenna 1. This can be the case for leakage of a transmission signal 129 into a receiving antenna 16. A converted signal 122 from a data converter 22 in place of the demodulated output signal 121 from the demodulator 20 is input to a correlation detector 59 in the variable frequency characteristic filter 19. An error signal 123 output from a demodulator 20 and a frequency offset signal 127 output from a multiplier 23 are used in the same manner as in the conventional case. Therefore, the interference signal caused by leakage of the transmission signal 129 into the receiving antenna 16 can be effectively cancelled by the adder 18 according to the interference error signal 118 from the variable frequency characteristic filter 19. The cancellation operation for the interference signals caused by leakage of the transmission singals 115 and 127 into the corresponding receiving antennas 16 and 1 can be performed in the same manner as in the conventional case. More specifically, an output signal 111 from a modulator 11 in the upward channel is input to a transversal filter 58 in a variable frequency characteristic filter 14. The transversal filter 58 supplies an interference cancellation signal 119 to the downward channel adder 18. On the other hand, an output signal 125 from a downward channel modulator 24 is supplied to a transversal filter 56 in a variable frequency filter 6. An output signal 104 from the transversal filter 56 is input as an interference cancellation signal to an upward channel adder 4.

In the above description, scrambling is exemplified as the conversion operation of the data converters 9 and 22. However, the conversion scheme of the data converting means is not limited to scrambling. Any conversion scheme may be adopted in the correlation detector in the variable frequency characteristic filter if the corresponding interference signal can be identified and inverse conversion can be performed.

FIG. 3 is a block diagram of a one frequency repeater for upward and downward channels according to another embodiment of the present invention, only illustrating the upward channel modulation and transmission circuit arrangement as well as the downward channel reception and demodulation circuit arrangement.

Referring to FIG. 3, a predetermined modulated input signal 301 is input from a terminal 51 to a modulator 31 and is sent as a transmission signal 305 to a destination station through a transmitter 34, a branch circuit 36, and a transmitting antenna 37. Similarly, a reception signal 306 sent from the source station is output as a demodulated output signal 310 at a terminal 52 through a receiving antenna 38, a branch circuit 39, a receiver 40, an adder 41, and a demodulator 42. The general operation of the circuit arrangement including a variable frequency characteristic filter 33 and an adder 41 is the same as that in FIG. 1. The only difference between the arrangements in FIGS. 1 and 3 lies in the fact that a fixed filter 32 is connected in series with the variable frequency characteristic filter 33 in FIG. 3. The fixed filter 32 is designed to obtain characteristics corresponding to the frequency characteristics inherent to the transmitter and the receiver from formation of an interference signal upon leakage of the transmission signal into the reception signal to input of a superposed signal into the adder 41 upon superposing of the interference signal onto the IF reception signal 307, with reference to the output point of the modulator 31 in the transmission system. The correction function for the natural frequency characteristics inherent to the transmitter and the receiver is not required for the variable frequency characteristic filter 33 connected in series with the fixed filter 32. Therefore, only the correction function for correcting variable factors in the variable interference route in the process for forming the interference signal upon leakage of the transmission signal into the reception signal need be included. As a result, the correction function for the variable interference routine of the variable frequency characteristic filter 33 can be sufficiently guaranteed. The interference signal can be accurately cancelled by the adder 41. In the above description, the fixed filter 32 corrects all variations in natural frequencies inherent to the transmitter and the receiver. However, the variable frequency characteristic filter 33 may be designed to include some of the characteristics of the fixed filter 32.

Figure 4:
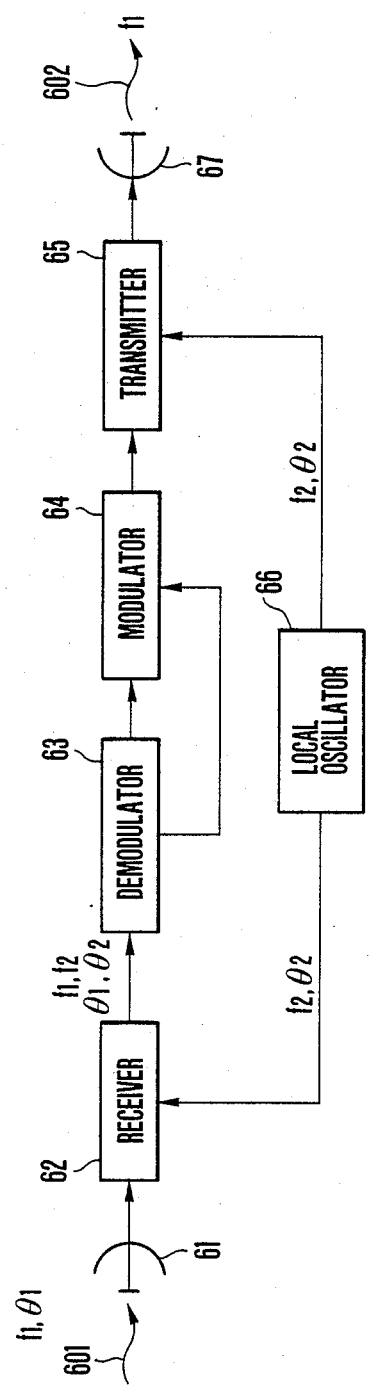
FIG. 4 is a block diagram of a one frequency repeater according to still another embodiment of the present invention.

FIG. 4 is a block diagram showing the main part of the repeating system corresponding to one-direction route of a repeater according to still another embodiment of the present invention. This repeater includes a receiving antenna 61, a receiver 62, a demodulator 63, a modulator 64, a transmitter 65, and a local oscillator 66.

Referring to FIG. 4, a reception signal 601 having a carrier frequency of f1 is input to the receiver 62 through a receiving antenna 61. The receiver 62 includes a frequency converter and an IF amplifier. The reception signal 601 is converted into a predetermined IF signal in response to a local oscillated signal sent from the local oscillator 66. The converted signal is amplified by the IF amplifier. The amplified output is input to the demodulator 63. In this case, the carrier frequency of the IF signal is equal to a difference between the carrier frequency f1 of the reception signal 601 and a frequency f2 of the local oscillated signal from the local oscillator 66. The phase of the IF signal is equal to a difference between a phase $\theta1$ of the reception signal 601 and a phase $\theta2$ of the local oscillated signal. The demodulator 63 adopts an orthogonal phase-locked detection scheme as a demodulation scheme in correspondence with an input such as a digital multiphase modulated wave or a digital multilevel orthogonal modulated wave in the same manner as in the conventional repeater. The demodulator 63 includes an equalizer or the like for eliminating amplitude and phase distortion components included in the reception signal.

The demodulator 63 recovers a carrier wave through a carrier recovery phase-locked loop included in the orthogonal phase-locked detection system. The recovered carrier signal has the same frequency as that of the carrier frequency (f1−f2) of the IF signal and the same phase as ($\theta1-\theta2$). The phase of the IF signal is detected by a pair of phase detectors included in the demodulator 63 in response to the recovered carrier wave, and thus the baseband signal is output. In this case, the recovered carrier wave having the frequency of f1−f2 and the phase of $\theta1-\theta2$ is sent to the modulator 64 as a carrier signal corresponding to the transmission signal. The modulator 64 modulates the recovered carrier wave in response to the baseband signal sent from the demodulator 63 so that the recovered carrier wave is modulated. The modulated signal is sent to the transmitter 65. The transmitter 65 includes a frequency converter and a power amplifier. The modulated signal is converted into a transmission signal having a frequency f1=(f1−f2)−f2 and a phase $\theta1=(\theta1-\theta2)-\theta2$ in response to the local oscillated signal of a frequency f2 and a phase $\theta2$ sent from the local oscillator 66. The power of the converted signal is amplified by the power amplifier and sent as a transmission signal 602 from a transmitting antenna 67. As described above, the carrier frequency of the transmission signal 602 is set to be f1 and the phase thereof is $\theta1$. The frequency and phase of this signal are equal to those of the reception signal 601. Therefore, since the carrier frequencies are equal to each other and the phases are given with a predetermined correlation, the interference signal caused by leakage of the transmission signal into the reception singal can be cancelled in accordance with the same principle as for amplitude and phase distortions.

In the above embodiment, the means for cancelling the interference signal caused by leakage of transmission signal into the reception signal is an equalizer for eliminating the amplitude and phase distortions included in the reception signal. However, even if the equalizer is not included in the repeater system, the modulated signal output from the modulator 64 may be branched in FIG. 4, and the branched signal may be added to the IF signal output from the receiver 62 through a predetermined transversal filter, thereby cancelling the interference signal.

FIG. 5 shows a one frequency repeater having two routes along one direction according to still another embodiment of the present invention. Referring to FIG. 5, the repeater comprises receiving antennas 71 and 81, receivers 72 and 82, local oscillators 73 and 83, adders 74 and 84, demodulators 75 and 85, modulators 76 and 86, carrier generators 77 and 87, transmitters 78 and 88, transmitting antennas 79 and 89, a variable frequency characteristic filter 91 including a correlation detector 92 and a transversal filter 93, and a variable frequency characteristic filter 94 including a correlation detector 95 and a transversal filter 96.

Referring to FIG. 5, reception signals 701 and 702 having carrier frequencies f1 and f2 and corresponding to two routes are input to the receivers 72 and 82 through the reception antennas 71 and 81, respectively. In the receivers 72 and 82, the reception signals 701 and 702 are converted into predetermined IF signals in response to local oscillated signals sent from the local oscillators 73 and 83, respectively. The IF signals are amplified and then supplied to the adders 74 and 84, respectively. The IF signals are added by the adders 74 and 84 to interference cancellation signals 711 and 712 sent from the transversal filters 93 and 96 included in the variable frequency characteristic filters 91 and 94, respectively, so that the interference signals caused by leakage of the transmission signals into the reception signals are cancelled. The resultant signals are input to the demodulators 75 and 85, respectively. The demodulators 75 and 85 are designed according to an orthogonal phase-locked detection scheme as a demodulation scheme in correspondence with the input such as a digital multiphase modulated wave or a digital multivalue orthogonal amplitude modulated wave. A demodulated signal 705 output from the demodulator 75 is supplied to the modulator 76 and the correlation detector 95. An output signal 706 from the demodulator 86 is sent to the modulator 86 and the correlation detector 92. The modulators 76 and 86 modulate the predetermined carrier signals input from the carrier generators 77 and 87 by using the demodulated signal as the baseband signals, respectively. The modulated signals 713 and 714 are sent to the transmitters 78 and 88 and to the transversal filters 96 and 93, respectively. Each of the transmitters 78 and 88 includes a frequency converter and a power amplifier. The carrier frequencies of the modulated signals are converted into the carrier frequencies f2 and f1 according to the local oscillation frequencies input from the local oscillators 73 and 83, respectively. The signals having the frequencies f2 and f1 are amplified to predetermined power levels. The amplified signals are then sent as transmission signals 703 and 704 from the transmitting antennas 79 and 89 to he destination station. In the route corresponding to the reception signal having the carrier frequency f1, the carrier frequency corresponds to the transmission signal 703 having a frequency f2. In the route corresponding to the reception signal 702 having a frequency f2, the carrier frequency corresponds to the transmission signal 704 having a frequency f1. In this manner, the reception and transmission frequencies differ from each other.

In the pair of repeating systems, the modulated signal 713 of the IF band output from the modulator 76 in the route (to be referred to as an A route hereinafter) corresponding to the reception signal 701 (f1) is sent to the transversal filter 96 included in the variable frequency characteristic filter 94. The modulated signal 714 of the IF band output from the modulator 86 in the route (to be referred to a B route hereinafter) corresponding to the reception signal 702 (f2) is sent to the transversal filter 93 included in the variable frequency characteristic filter 91. An error signal 707 output from the demodulator 75 in the A route and an error signal 708 output from the demodulator 85 in the B route are input to the correlation detectors 92 and 95, respectively. The demodulated signal 705 of the A route is a superposed signal of the baseband signal of the A route and the interference signal caused by leakage of the transmission signal in the B route. The modulated signal 06 of the B route is a superposed signal of the baseband signal of the B route and the interference signal caused by leakage of the transmission signal of the A route. The error signals 707 and 708 output from the demodulators 75 and 85 include the interference signals caused by leakage of the B route transmission signal and of the A-route transmission signal, respectively. The correlation detector 92 detects a correlation between the demodulated signal 706 and the error signal 707 to detect the B route interference signal obtained by transmission signal leakage into the A route reception signal with respect to the demodulated signal 706. The correlation detector 92 outputs a plurality of control signals 709 for minimizing the interference signal. The control signals 709 are supplied to the corresponding tap weighting circuits in the transversal filter 93. The transversal filter 93 receives the modulated signal 714 of a B-route IF band output from the modulator 86. The control of each tap weighting circuit in response to the control signals 709 is effected, and then the interference cancellation signal 711 of the IF band is produced. The interference cancellation signal 711 is input to the adder 74 and is added thereby to the reception signal of the A route IF band, so that the superposed interference signal is cancelled. In the same manner as described above, the behavior of the phase detector 95 and the transversal filter 96 in the filter 94 is effected, and the interference signal superposed on the reception signal of the B route IF band is cancelled in response to the interference cancellation signal input to the adder 84. In this system, the frequencies f1 and f2 have a difference so as not to cause mutual interference between the repeating systems. The interference between the transmitter and receiver in the same route is not caused and does not present a problem.

What is claimed is:

1. A one frequency repeater for a digital radio system comprising: means for receiving a reception signal through a receiving antenna; a transmitting antenna from which a transmission signal is transmitted, the transmission signal from said transmitting antenna leaking into said receiving antenna; means for generating an interference cancellation signal for cancelling an interference signal caused by the leakage of the transmission signal included in an output signal from said receiving means; means for adding the interference cancellation signal and the output signal of said receiving means; demodulating means for detecting an amplitude and a phase of the interference signal from an output signal of said adding means, and providing a demodulated signal and an error signal obtained from said detected amplitude and phase of the interference signal; means for data-converting the demodulated signal; modulating means for modulating a carrier according to an output from said data converting means; and transmitting means for transmitting the modulated signal from said transmitting antenna; said interference cancellation signal generating means receiving the modulated signal and supplying the interference cancellation signal to said adding means in response to the error signal and converted data signal from said data converting means.

2. A repeater according to claim 1, wherein said transmitting means and said receiving means comprises common local oscillator, and said demodulating means comprises carrier recovery synchronizing means for supplying to said modulating means a recovered carrier wave for generating a carrier of the transmission signal having a phase correlation with a carrier of the reception signal.

3. A repeater according to claim 1, wherein said interference cancellation signal generating means comprises first signal waveform correcting means having predetermined variable frequency characteristics.

4. A repeater according to claim 3, further comprising second signal waveform correcting means, inserted between said modulating means and said interference cancellation signal generating means and having fixed frequency characteristics corresponding to a transmission route of the interference signal caused by leakage of the transmission signal into said reception antenna.

5. A repeater according to claim 1, wherein each of said receiving means, said demodulating means, said modulating means, said transmitting means, and said interference cancellation signal generating means comprises a plurality of unit means respectively, to constitute a plurality of routes having an identical direction but different frequencies, an output from said unit demodulating means belonging to each route being connected to an input of said unit modulating means belonging to another route.

6. A repeater according to claim 1, wherein said interference cancellation signal generating means is responsive to a signal representing a frequency offset between a carrier wave signal outputted from said demodulating means and a carrier wave signal supplied to said modulating means, the signal representing the frequency offset being generated by a multiplier for obtaining a product of carrier waves of said modulating means and said demodulating means.

7. A repeater according to claim 6, wherein said inteference cancellation signal generating means comprises a correlation detector responsive to the error signal, the frequency deviation signal and the output of said data converting means, and a transversal filter responsive to the output of said correlation detector to generate the inteference cancellation signal.

8. A repeater according to claim 1, wherein said inteference cancellation signal generating means comprises a correlation detector responsive to the error signal and the output of said data converting means, and a transversal filter responsive to an output of said correlation detector to generate the inteference cancellation signal.

9. A repeater for a digital radio system having first and second routes having an identical transmission direction but different frequencies, $f_1$ and $f_2$ comprising;
    first and second transmitters for transmitting transmission signals of $f_1$ and $f_2$, respectively;
    first and second transmitters for transmitting transmission signals of $f_1$ and $f_2$, respectively, the transmission signals leaking into corresponding receivers, respectively;
    first and second modulators for modulating carrier waves of $f_1$ and $f_2$ with input signals thereof to output modulated signals to said first and second transmitters, respectively;
    first and second signal generators for generating first and second interference cancelling signals, respectively;

first adder for adding the output signal of said first receiver and the first interference cancelling signal to output a first error signal;

second adder for adding the output signal of said second receiver the second interference cancelling signal to output a second error signal;

first demodulator for supplying a demodulated data signal to said second modulator and said second signal generator, and the first error signal output from said first adder to said first signal generator; and second demodulator for supplying a demodulated data signal to said first modulator and said first signal generator, and the second error signal output from said second adder to said second signal generator.

* * * * *

UNITED STATES PATENT AND TRADEMARK OFFICE
CERTIFICATE OF CORRECTION

PATENT NO. : 4,789,993

DATED : December 6, 1988

INVENTOR(S) : TOSHIHIKO RYU

It is certified that error appears in the above-identified patent and that said Letters Patent is hereby corrected as shown below:

Column 2, line 34, delete "singal" and insert --signal--.

Column 3, line 61, delete "antenna 5" and insert --antenna 15--.

Column 5, line 58, delete "signals"and insert --signal--.

Column 7, line 51, delete "singal" and insert --signal--.

Column 9, line 6, delete "06" and insert --706--.

Signed and Sealed this

Twelfth Day of September, 1989

Attest:

DONALD J. QUIGG

Attesting Officer

Commissioner of Patents and Trademarks